UNITED STATES PATENT OFFICE.

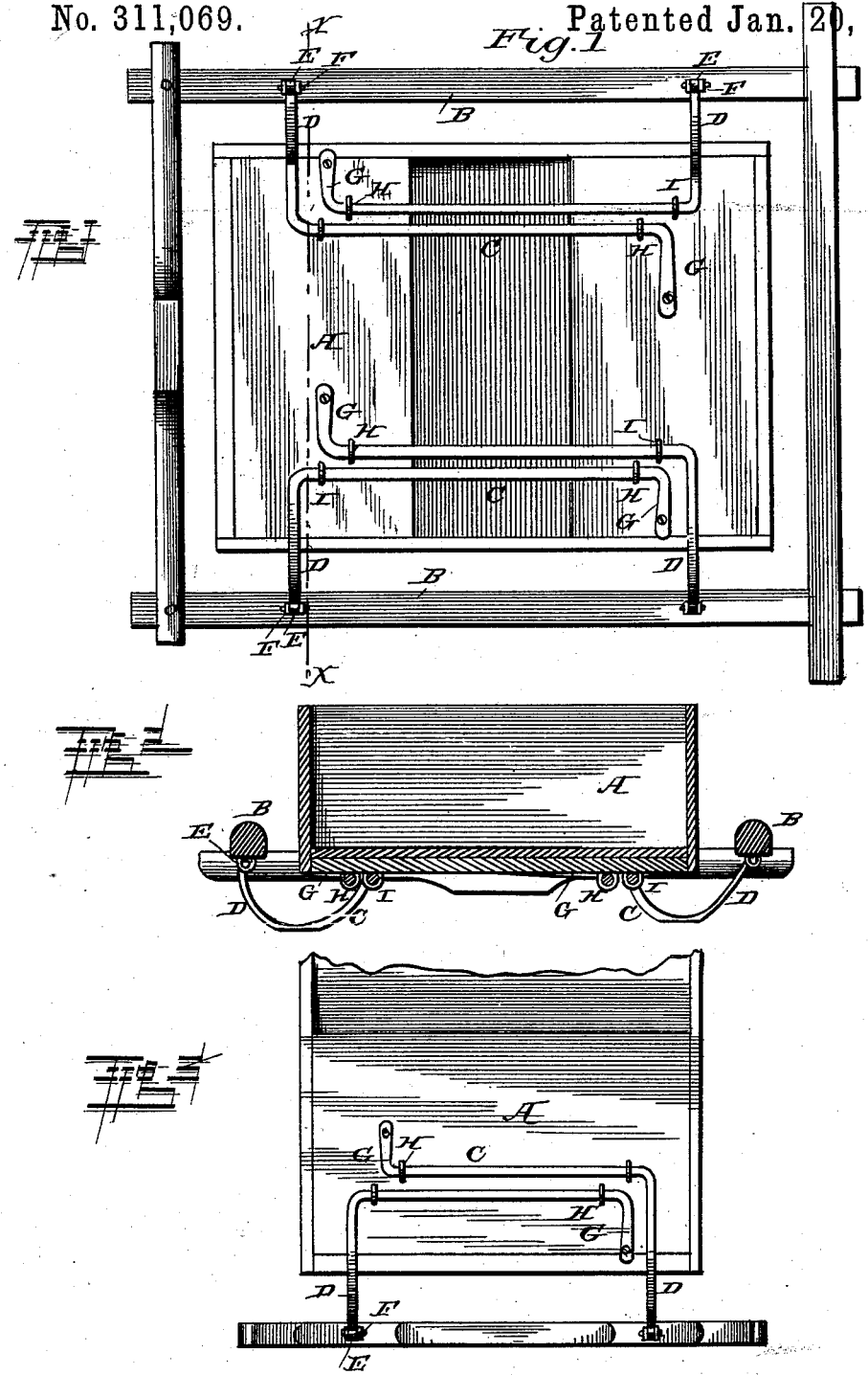

WILLIAM KENDRY FRALEY, OF FOREST HILL, INDIANA.

CARRIAGE-SPRING.

SPECIFICATION forming part of Letters Patent No. 311,069, dated January 20, 1885.

Application filed August 29, 1884. (No model.)

*To all whom it may concern:*

Be it known that I, W. K. FRALEY, of Forest Hill, in the county of Decatur and State of Indiana, have invented certain new and useful Improvements in Carriage-Springs; and I do hereby declare that the following is a full, clear, and exact description of the invention, which will enable others skilled in the art to which it appertains to make and use the same, reference being had to the accompanying drawings, which form a part of this specification, and in which—

Figure 1 is a bottom view of a side-bar vehicle equipped with my improved springs. Fig. 2 is a transverse sectional view of the same, taken on the line $xx$ in Fig. 1; and Fig. 3 is a bottom view showing my improved springs applied to an end-spring running-gear.

The same letters refer to the same parts in all the figures.

This invention relates to springs for various kinds of carriages and wagons with or without side bars; and it has for its object to produce springs which shall possess superior advantages in point of simplicity, durability, and general efficiency.

With these ends in view the invention consists in certain improvements in the construction and arrangement of the said springs, which will be hereinafter fully described, and particularly pointed out in the claim.

In the drawings hereto annexed, A designates the body, and B B the side bars, of an ordinary side-bar buggy. C C are the springs, two of which are arranged at each side of the vehicle. Said springs consist of rods or bars of steel the outer ends of which are bent outwardly at right angles, or approximately so, to the bodies of the said bars, curved, flattened on their under sides, as shown at $b$ in Fig. 2 of the drawings, and connected by links E and clips F to the side bars, as clearly shown in the drawings. The curved and flattened ends D should be sufficiently strong, and at the same time sufficiently elastic and yielding, to constitute the springs, and they are re-enforced by the bodies of the rods or bars, as will be presently described. The inner ends of the rods C C are bent in opposite directions, so as to form arms G at right angles thereto, which are laid flat against the under sides of the sills of the vehicle-body, to which they may be secured by bolts, screws, or in any other suitable manner, and additionally, near the points at which they are bent from the rods C, by means of transverse clips or staples H. Staples or clips I also secure the rods C near the points at which the curved spring-sections D are bent outwardly from the same. By bending the arms G G in opposite directions, as described, I avoid the necessity of causing the springs to overlap each other at any point, which would render the device bulky and defective in operation, not to mention the liability to break, and for stones and other obstructions to lodge at the overlapping-points.

The operation of this invention will be readily understood from the foregoing description, taken in connection with the drawings hereto annexed. Owing to the construction of the spring-rods C D, the vehicle-body may be hung very low, and the weight will be equalized over all the springs, thus insuring an easy-riding vehicle. The method of attaching the rods C will cause the latter, when the load is placed in the vehicle-body, to be twisted in the direction of their length, thereby augmenting the elasticity as well as the power of recovery of the spring portions D. It will also be seen that by the method of arranging the spring-bars in pairs beside each other, as described, they may be drawn apart or extended longitudinally, so that the same set of springs may be adapted to vehicle-bodies of different length.

In Fig. 3 of the drawings I have shown my improvements applied to an end-spring running-gear. In this case the rods C are arranged transversely under the ends of the vehicle-body, and connected by suitable clips with semi-elliptic springs mounted upon the axles; or the said springs may be dispensed with and the spring portions D of the rods C be clipped directly to the axles.

Other modifications will readily suggest themselves to those skilled in the art to which my invention appertains, and I would therefore have it understood that I do not limit myself to the precise construction and arrangement of parts herein shown and described, but reserve to myself the right to any modifications which may be resorted to without departing from the spirit of my invention.

Having thus described my invention, I claim and desire to secure by Letters Patent of the United States—

The combination, with a vehicle-body, of spring-bars arranged in bearings or staples under the same, and having at their outer ends downwardly-extending curved arms, flattened on their under sides, as at $b$, so as to form supplemental springs of superior elasticity to the torsion-springs formed by the said spring-bars, and suitably connected with the side bars or axles, and provided at their inner ends with arms or brackets bent in opposite directions and secured to the under side of the vehicle-body, substantially as and for the purpose herein shown and specified.

In testimony that I claim the foregoing as my own I have hereunto affixed my signature in presence of two witnesses.

WILLIAM KENDRY FRALEY.

Witnesses:
JOHN W. CRISE,
FRANCIS M. CRISE.